United States Patent
Janke

(10) Patent No.: US 8,070,008 B2
(45) Date of Patent: Dec. 6, 2011

(54) SEALING PLUG WITH A PRESSURE-COMPENSATING CHAMBER

(75) Inventor: Ulf Janke, Hildesheim (DE)

(73) Assignee: ITW Automotive Products GmbH & Co. KG, Iserlohn (DE)

( * ) Notice: Subject to any disclaimer, the term of this patent is extended or adjusted under 35 U.S.C. 154(b) by 786 days.

(21) Appl. No.: 12/279,047

(22) PCT Filed: Jan. 12, 2007

(86) PCT No.: PCT/IB2007/000090
§ 371 (c)(1), (2), (4) Date: Aug. 11, 2008

(87) PCT Pub. No.: WO2007/093862
PCT Pub. Date: Aug. 23, 2007

(65) Prior Publication Data
US 2009/0078704 A1  Mar. 26, 2009

(30) Foreign Application Priority Data
Feb. 16, 2006 (DE) .............. 10 2006 007 914

(51) Int. Cl.
B65D 53/00 (2006.01)

(52) U.S. Cl. .............. 220/233; 220/359.4; 220/789; 220/DIG. 19; 16/2.2; 277/645; 277/646; 277/926; 277/928

(58) Field of Classification Search .............. 16/2.1, 16/2.2, 2.3, 2.4, 2.5, 108, 109; 174/83, 136, 174/152, 153, 154, 167; 285/130, 213; 384/276; 439/207; 277/645, 646, 926, 927, 928; 217/98, 217/113, 105, 110, 99, 104, 111; 220/233, 220/359.4, 789, DIG. 19
See application file for complete search history.

(56) References Cited

U.S. PATENT DOCUMENTS
3,851,794 A * 12/1974 Hehl .............. 220/789
(Continued)

FOREIGN PATENT DOCUMENTS
DE  10148493 A1  4/2003
(Continued)

OTHER PUBLICATIONS
International Search Report for PCT/IB2007/000090 dated May 4, 2007.

Primary Examiner — Victor Batson
Assistant Examiner — Jeffrey O Brien
(74) Attorney, Agent, or Firm — Lowe Hauptman Ham & Berner LLP

(57) ABSTRACT

A plug to hermetically seal an aperture in a sheetmetal, or in the floor of a vehicle, comprising, a cap covering the aperture and comprising an external, circumferential flange resting on one side of the sheetmetal or of the floor and fitted with a first circumferential seal, an affixation portion entering said aperture and, a second circumferential seal configured at the cap or at the affixation portion and being a distance from the first seal and resting against the sheetmetal or the said floor, a cavity being subtended by the sheetmetal or said floor, the two seals and at least one wall of the plug, where said plug, includes a pressure-compensating chamber, which communicates with the cavity and, which compensates a change in pressure, caused by a change in temperature, inside the cavity, by changing the volume of the pressure-compensating chamber.

18 Claims, 2 Drawing Sheets

U.S. PATENT DOCUMENTS

| | | | | |
|---|---|---|---|---|
| 4,290,536 | A | * | 9/1981 | Morel ............................ 220/789 |
| 4,801,040 | A | * | 1/1989 | Kraus ..................... 220/DIG. 19 |
| 4,938,378 | A | * | 7/1990 | Kraus ............................ 220/789 |
| 4,998,642 | A | * | 3/1991 | Kraus ............................ 220/789 |
| 5,040,803 | A | | 8/1991 | Cieslik et al. |
| 6,296,136 | B1 | * | 10/2001 | Huet ............................. 220/233 |
| 7,108,269 | B2 | | 9/2006 | Benkel et al. |
| RE39,654 | E | * | 5/2007 | Huet .............................. 220/789 |
| 7,997,437 | B2 | * | 8/2011 | Jatzke et al. ................... 220/789 |
| 2005/0000973 | A1 | * | 1/2005 | Sbongk .................. 220/DIG. 19 |

FOREIGN PATENT DOCUMENTS

| | | | |
|---|---|---|---|
| EP | 1298037 | A1 | 4/2003 |
| WO | 2004076239 | A1 | 9/2004 |

* cited by examiner

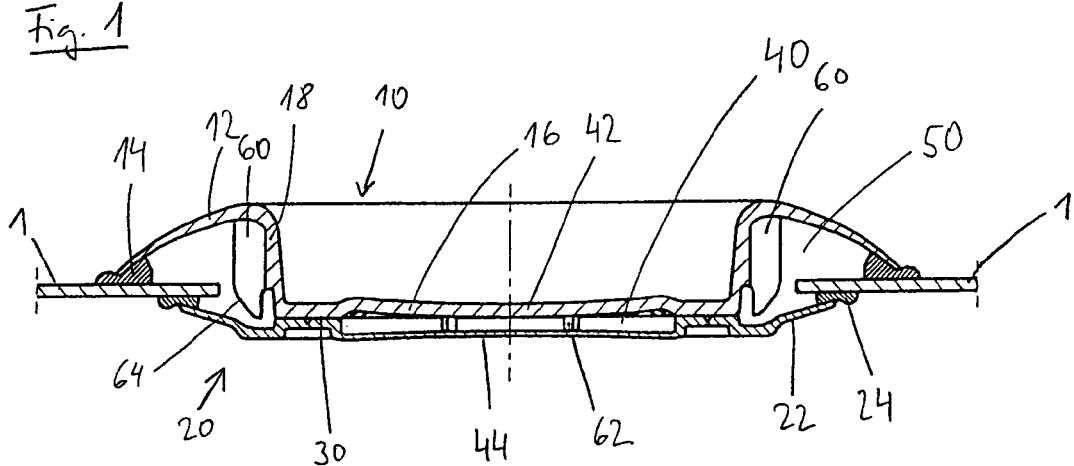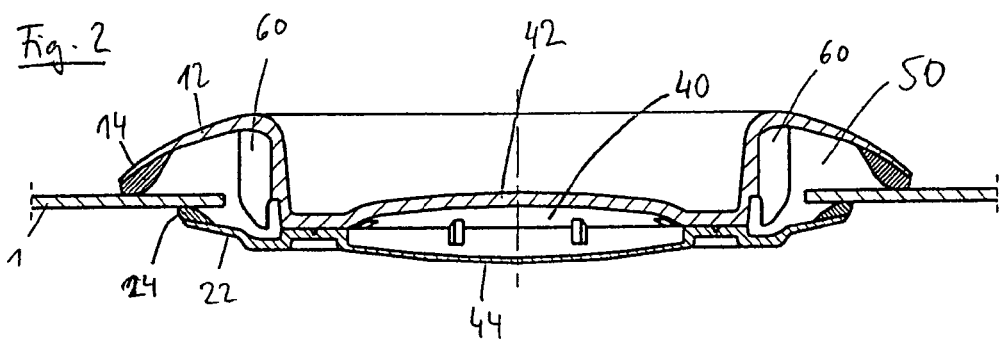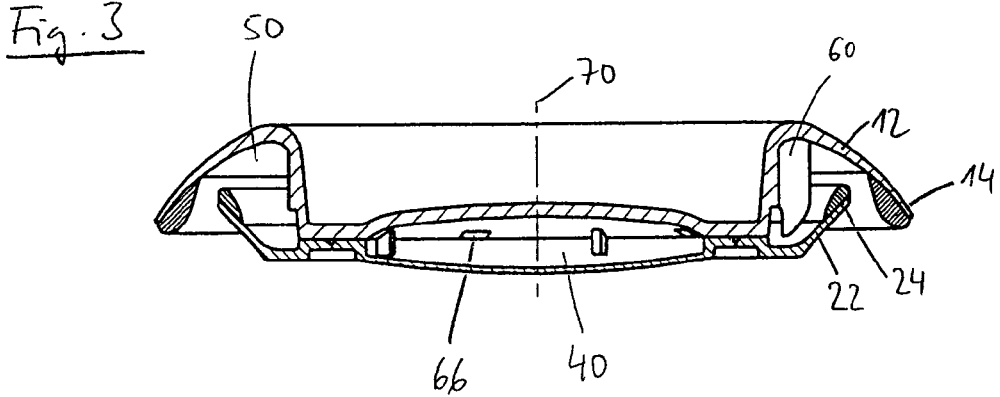

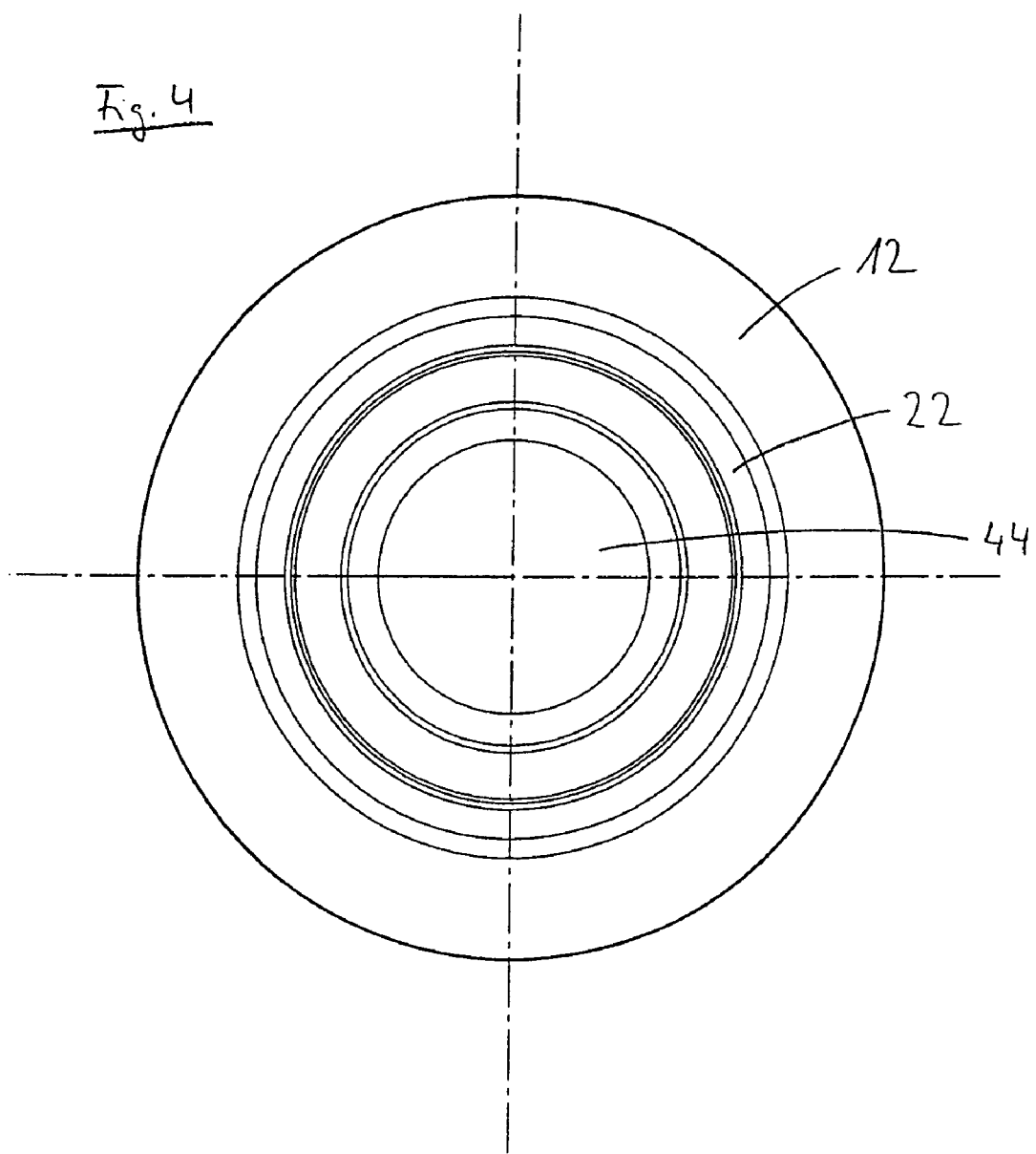

SEALING PLUG WITH A PRESSURE-COMPENSATING CHAMBER

RELATED APPLICATIONS

The present application is based on International Application Number PCT/IB07/000090 filed Jan. 12, 2007, and claims priority from German Application Number 10 2006 007 914.0 filed Feb. 16, 2006, the disclosures of which are hereby incorporated by reference herein in their entirety.

The present invention relates to a plug, in particular to a two-seal plug, hermetically sealing an aperture in a vehicle's body sheetmetal or floor.

Automobile body parts or bodies are dipped into appropriate baths for purposes of handling and varnishing/enameling. Such bodies or body parts are fitted with apertures or the like to allow the liquid to enter and then drain from cavities. Foremost corrosion protection requires subsequently sealing said apertures. A large number of sealing plugs are known to seal said apertures. Said plugs are conventionally made of plastic and are put in place simply by being manually pressed into said apertures. Most of these plugs are fitted with a flange resting against one side of the sheetmetal, further with a locking element engaging from behind the other sheetmetal side. The objective being to preclude penetration of air and/or water, said flange rests in sealing manner against the sheetmetal, optionally an additional seal being provided, for instance in the form of a hot melt, adhesive, hereafter termed hot melt. In the event hot melts are used, the locking elements may be omitted and the sealing plug may be affixed solely using said adhesive. Lastly plugs also are known that consist solely of a hot melt.

The German patent document DE 101 48 493 B4 discloses a plug which seals reliably using two separate seals. A first seal is configured at a peripheral flange pointing outward from the plug and resting on a first side of the sheetmetal when said seal is inserted in said aperture. A second seal is configured in the vicinity of the sheetmetal rim. Both seals may be fitted with a hot melt and may be spaced apart from each other.

When being put in place, the known sealing plug is inserted into an aperture of a freshly enameled body part which then is put into an oven to cure/bake the enamel. The sealing plug is heated together with said body part and the hot melt fuses in the process.

However the known plug does not always seal adequately. Water may pass through said aperture and corrode the body part.

Based on the above state of the art, the objective of the present invention is to create a plug offering reliable sealing.

The present invention rests on the observation that, in the prior art, as regards sealing plugs such as disclosed in said German patent document DE 101 48 493 B4, some constituent parts of said plug, namely the two seals and the sheetmetal, do subtend a cavity which is closed and sealed by the hot melt, the volume of said cavity simultaneously being uniquely defined by the plug geometry. When a body part fitted with such a known body part is removed from the oven, the gas enclosed in said cavity will cool jointly with the body part. This change in temperature lowers the pressure inside the cavity. On account of this pressure drop inside the cavity, ambient air may be sucked into the cavity and the seal in this zone shall warp, for instance on account of bubbles or ducts being formed at and/or in it. Such changes in the seal may entail defective sealing.

The above problem is solved by the invention and the aforementioned drawbacks of known plugs are averted by the features defined in claim 1. The plug of the present invention hermetically sealing an aperture in a sheetmetal or in the floor of a vehicle comprises a cap covering the aperture and fitted with a circumferential, external flange resting on one side of the sheetmetal or floor and including a first circumferential seal, furthermore an affixation portion entering said aperture and a second seal mounted on said cap or the affixation portion and configured at a distance from the first seal to be resting against said sheetmetal or floor, a cavity being subtended thereby that is bounded by the sheetmetal or the floor, by the two seals and at least one wall of the plug. The present invention also provides a pressure-compensating chamber communicating with said cavity and compensating the pressure changes within this cavity that are due to changes in the volume of said pressure-compensating chamber.

The volume subtended between the two seals therefore may be matched to different pressures or temperatures. The ambient air is reliably prevented from flowing from the sealing region into the cavity or to escape from it. Accordingly the hermetic properties of the seals are not affected by local seal deformations or displacements.

In one embodiment mode of the present invention, the pressure-compensating chamber is designed to be elastically deforming. In principle the change in volume of the pressure-compensating chamber can be implemented by an arbitrary deformation. For that purpose the pressure-compensating chamber comprises at least one deformable wall. Said wall illustratively may be a sheet deforming when there is a change in pressure. However elastic deformation of at least one pressure-compensating chamber wall is preferred. Because of its elasticity, the pressure-compensating chamber assumes a defined shape at assembly and hence presents a defined volume. The pertinent elasticity however must be ample enough not to oppose the desired pressure compensation by the entailed elastic forces. The pressure differential between the cavity and ambience must remain within given limits.

In a further embodiment of the present invention, the pressure-compensating chamber deforms in a manner allowing changes in excess of 25% in the volume subtended between the cavity and the pressure-compensating chamber. A volume change larger than 25% is required to keep constant the pressure in the presence of the temperature fluctuations.

In a further embodiment of the present invention, at least one seal is fitted with a hot melt. Basically the present invention can be advantageously combined with various seals of which the properties change with temperature. The present invention moreover allows opposing disadvantageous changes in the surface cooperating with the plug's seal, for instance an enamel. However combining the present invention with a hot-melt fitted seal is especially advantageous because said plug then will be simultaneously bonded to the body part.

In one design of the present invention, the affixation portion is fitted with snap-in means engaging from behind the sheetmetal or the floor. The said affixation portions secure the plug inserted into the said aperture.

In another design of the present invention, the second seal is configured on the sheetmetal side opposite the side of the first seal. In this design the compressive forces of the two seals act in opposite directions, as a result of which both seals can be loaded with the required compressive forces. Preferably the first flange shall be elastic. In this manner, in the plug's inserted position, the circumferential seal mounted on the flange shall be uniformly pressed against the sheetmetal or the vehicle floor.

In yet another design of the present invention, the affixation portion comprises a second circumferential flange engaging from behind the sheetmetal or floor and receiving the second circumferential seal. Said second flange preferably shall be elastic. In this design the second circumferential seal is pressed by elastic forces from the second flange against the back side of the sheetmetal or vehicle floor. If the second flange is non-elastic, the compressive forces required by the second circumferential seal also shall be exerted by the first elastic flange, or vice-versa.

Preferably the second flange runs obliquely outward toward the first flange. In this configuration, the second flange exerts forces acting in the direction of the first flange on the participating seals. Also the obliqueness of the second flange makes it easier to insert the plug into the said aperture.

In another design of the present invention, the communication between the cavity and the pressure-compensating chamber is implemented by ducts. Basically any kind of communication between cavity and pressure-compensating chamber is admissible. In particular there is no need for a partition into two well defined regions, namely cavity and the pressure-compensating chamber's inside space. These two sub-volumes also may be separated from each other merely by a conceptual line. Advantageously however the pressure-compensating chamber shall be separate from the cavity and communication between them shall be implemented merely using one or more ducts. In this manner the present invention clearly bounds the easily deforming wall of the pressure-compensating chamber and the other comparatively rigid components of the plug.

Preferably too, the pressure-compensating chamber comprises two bulging boundary walls connected to each other at their rims. These boundary walls may be round, subtending thereby a lens-shaped pressure-compensating chamber, though they also may be polygonal, for instance rectangular, whereby the pressure-compensating chamber assumes a pillow shape. In every case the resultant pressure-compensating chamber will experience a comparatively large change in volume due to comparatively minor shape changes of the boundary walls.

In one embodiment mode, the two bulging mutually rim-connected boundary walls exhibit different thicknesses. As a result, the thinner boundary wall will deform especially easily. This deformation will be especially well defined. The same effect also may be attained using boundary walls made of different materials.

In a further embodiment of the present invention, the plug's cap constitutes one of the boundary walls. This feature offers especially simple plug design.

In a further embodiment mode of the present invention, the plug is made in two parts, namely a cap and an affixation portion that are fused into each other. Ultrasonic fusion preferably shall be used to join the cap and the affixation portion to each other. The two-part design allows simplified manufacture whereby the cap and the affixation portion are advantageously manufactured separately each by injection molding and thus can be separately ejected. The mechanical stresses experienced by the parts of the plug when being ejected can be reduced by the two-part manufacture. In particular this two-part manufacture allows automated visual control of the two parts, in particular also of the two seals.

In one embodiment mode of the present invention, said cap comprises a base wall of lesser diameter than said aperture of which the outer rim adjoins a cylindrical portion, said first flange running from the end of this cylindrical portion away from the said base wall obliquely outward toward the base wall. This design allows inserting the cap's base wall into said aperture. In particular the base wall may be designed so that, in its inserted position, it shall be approximately level with the sheetmetal. Preferably one of the boundary walls of the pressure-compensating chamber is constituted by the cap's base wall.

In still another embodiment mode of the present invention, outward centering ribs run in the longitudinal direction of and on the said cylindrical portion. These centering ribs help to centrally insert the plug into the said aperture. The centering ribs preferably are designed to allow the affixation parts engaging from behind the sheetmetal or the vehicle floor to deform sufficiently inward when the plug is inserted into the aperture. Flexible centering ribs are especially well suited. In a further design, center rib flexibility is enhanced in that said ribs subtend an angle different from zero with the radial direction.

The present invention is elucidated below by the discussion of one embodiment mode and in relation to the four appended drawings.

FIG. 1 is cross-section, following cooling, of a sealing plug of the invention inserted in an appropriate aperture of the sheetmetal automobile body, FIG. 2 is a cross-section of the plug of FIG. 1 inserted in a body's sheetmetal aperture, prior to heating, FIG. 3 is a cross-section of the plug of FIGS. 1 and 2 prior to insertion, and FIG. 4 is a view from below of the plug of FIGS. 1 through 3.

FIG. 1 shows a sealing plug inserted into an aperture in the body sheetmetal 1. The plug consists of a cap 10 and an affixation portion 20. The shown plug is circular and rotationally symmetrical as shown in particular by the bottom view of FIG. 4.

The cap 10 and the affixation portion 20 are fused together along an annular zone 30. The cap 10 is fitted with an elastic, circumferential flange 12 in turn fitted with a first, circumferential hot melt seal 14. The cap 10 comprises a circumferential, annular bottom wall 16 adjoined by a cylindrical portion 18, the flange 12 being configured at that end of said portion 18 which is away from the bottom wall 16 and running outward and toward the sheetmetal 1.

Outside the annular connecting surface 30, the affixation portion 20 is fitted with a second flange 22 in turn fitted with a second seal 24 also a hot melt.

A pressure compensating chamber 40 is subtended between the bottom wall 16 of the cap 10 and the affixation portion 20. This pressure-compensating chamber 40 is bounded upwardly by an upper bounding wall 42 constituted by a part of the base 16 of the cap 10 and by a lower bounding wall 44 constituted by the central portion of the affixation portion 20.

A cavity 50 is bounded by the sheetmetal 1, by the seals 14 and 24, and the first and second flanges respectively 12 and 23 of the affixation portion 20. The volume of said cavity 50 is substantially predetermined by the configuration of the bounding surfaces. It communicates through ducts omitted from FIG. 1 with the inside of the pressure-compensating chamber 40.

The upper boundary wall 42 and the lower boundary wall 44 of the pressure-compensating chamber 40 are elastic, as a result of which a pressure change caused by a change in temperature within the cavity 50 is automatically compensated by a change in the volume of this pressure-compensating chamber 40.

As shown in the drawing, the lower boundary wall 44 of the pressure-compensating chamber 40 is thinner than the upper boundary wall 42. Spacers 62 are configured between the two boundary walls 42 and 44 and predetermine a minimum spacing between the two boundary walls and hence a minimum volume of the pressure-compensating chamber 40.

The drawing also shows centering ribs 60 configured at the cylindrical portion 18 of the cap 10. The centering ribs 60 are beveled at their lower ends in the zone 64 to facilitate inserting the plug into the aperture. Moreover the dimensions of the centering ribs 60 are selected in a manner that the second flange 22 together with the circumferential seal 24 when inserted into said aperture is able to deform inward far enough in the direction of the centering ribs 60 to allow problem-free plug insertion into the aperture.

The two flanges 12 and 22 each run outward and toward the sheetmetal 1. Both are elastic and the two seals 14 and 24 apply a compressive force on the sheetmetal 1 when inserted.

FIG. 1 indicates that the two seals 14 and 24 assure reliable sealing and bonding in their cold state. Along its entire circumference, each seal 14, 24 is free of air inclusions or deformations caused by gases flowing in or out.

In its cool state shown in FIG. 1, and due to its corresponding deformation of the two boundary surfaces 42 and 44, the pressure-compensating chamber 40 exhibits its resultant minimum volume. The boundary surface deformation is designed in a manner that the pressure within the pressure-compensating chamber 40 and the cavity 50 substantially is that of the external ambience.

FIG. 2 shows the same sealing plug before heating. As yet the hot-melt seals 14 and 24 did not melt and therefore still retain their initial shapes. The boundary walls 42 and 44 of the pressure-compensating chamber 40 each bulge outward in a shape corresponding to their relaxed condition. The volume of the pressure-compensating chamber 40 is substantially larger than that shown in FIG. 1

FIG. 2 furthermore shows that the two elastic flanges 12 and 22 already press the seals 14 and 24 respectively against the sheetmetal 1. In this manner the plug is secured against accidental slipping or even against dropping out of the aperture. In this state prior to melting, however, the said seals are not yet hermetically sealing the cavity 50.

FIG. 3 shows the plug of FIGS. 1 and 2 before it is inserted into an aperture. FIG. 3 has been rotated around the axis of symmetry 70 relative to FIGS. 1 and 2, as a result of which only one centering rib is visible.

FIG. 3 shows a duct 66 connecting the pressure-compensating chamber 40 to the cavity 50.

FIG. 3 also shows the undeformed state of the two flanges 12 and 22. In that state, the first seal 14—which in the inserted condition rests on the top side of the sheetmetal 1—is situated underneath the second seal 24—which in the inserted state is configured below the sheetmetal 1. Consequently it is clear that in the inserted state, the two flanges 12 and 22 are elastically deformed and thereby apply a force on the sheetmetal 1. The two forces exerted by the flanges 12 and 22 point in opposite directions and thereby automatically position the plug at the desired height.

Again FIG. 3 shows that the upper boundary wall 42 and the lower boundary wall 44 of the pressure-compensating chamber 40 will assume their basic, undeformed shape as they do also in FIG. 2. When in this clearly shown outward pointing configuration, the upper boundary wall 42 is a distance away from the spacers 62.

FIG. 4 is view from below and elucidates the plug's symmetry of rotation. It shows the farthest outward flange 12 and the more inward underside of the second circumferential flange 22. The lower boundary wall of the pressure-compensating chamber 50 is indicated centrally at 44.

The invention claimed is:

1. A plug to hermetically seal an aperture in a sheetmetal, or in the floor of a vehicle, comprising: a cap covering the aperture and comprising an external, circumferential flange resting on one side of the sheetmetal or of the floor and fitted with a first circumferential seal, an affixation portion entering said aperture and a second circumferential seal configured at the cap or at the affixation portion and being a distance from the first seal and resting against the sheetmetal or the said floor, a cavity being subtended by the sheetmetal or said floor, the two seals and at least one wall of the plug, wherein said plug includes a pressure-compensating chamber, which communicates with the cavity and which compensates a change in pressure, caused by a change in temperature, inside the cavity, by changing the volume of the pressure-compensating chamber; the communication between the cavity and the pressure-compensating chamber which compensates the change in pressure is constituted by at least one duct.

2. Plug as claimed in claim 1, characterized in that the pressure-compensating chamber deforms elastically.

3. Plug as claimed in claim 1, characterized in that the pressure-compensating chamber deforms in a manner that the change in the volume enclosed by the cavity and the pressure-compensating chamber may be in excess of 25%.

4. Plug as claimed in claim 1, characterized in that at least one seal includes a hot-melt adhesive.

5. Plug as claimed in claim 1, characterized in that the affixation portion comprises snap-in elements engaging from behind the sheetmetal or the vehicle floor.

6. Plug as claimed in claim 1, characterized in that the second seal is configured on that side of the sheetmetal which is opposite the side on which the first seal is mounted.

7. Plug as claimed in claim 1, characterized in that the first flange is elastic.

8. Plug as claimed in claim 1, characterized in that the affixation portion comprises a second, circumferential flange which engages from behind the sheetmetal and which bears the second circumferential seal.

9. Plug as claimed in claim 8, characterized in that the second flange is elastic.

10. Plug as claimed in claim 8, characterized in that the second flange runs obliquely outward and toward the first flange.

11. Plug as claimed in claim 1, characterized in that the pressure-compensating chamber comprises two bulging boundary walls joined to each other at their rims.

12. Plug as claimed in claim 11, characterized in that the thicknesses of the boundary walls are different.

13. Plug as claimed in claim 11, characterized in that one boundary wall is constituted by the cap.

14. Plug as claimed in claim 1, characterized in that the plug is manufactured in two parts, namely the cap and the affixation portion, said cap and said affixation portion being fused to each other.

15. Plug as claimed in claim 1, characterized in that the cap is fitted with a base wall of a lesser diameter than the aperture's, the outer aperture rim adjoining a cylindrical portion, the first flange running obliquely outward, from the end of said cylindrical portion away from the base wall, toward said base wall.

16. Plug as claimed in claim 15, characterized in that the base wall of the cap constitutes a boundary wall of the pressure-compensating chamber.

17. Plug as claimed in claim 15, characterized in that outwardly pointing centering ribs configured at the cylindrical portion run in its longitudinal direction.

18. Plug as claimed in claim 17, characterized in that the centering ribs and the radial direction subtend between them an angle other than zero.

* * * * *